(12) United States Patent
Kulkarni et al.

(10) Patent No.: US 9,665,615 B2
(45) Date of Patent: May 30, 2017

(54) SEARCH-AS-YOU-TYPE ON A RELATIONAL DATABASE

(71) Applicant: Microsoft Technology Licensing, LLC, Redmond, WA (US)

(72) Inventors: Amit Raghunath Kulkarni, Bellevue, WA (US); Brian Russell Glaeske, Fargo, ND (US); Vijeta Johri, Bellevue, WA (US); Amar Nalla, Redmond, WA (US); Pramit H. Desai, Bellevue, WA (US); Tanmoy Dutta, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 264 days.

(21) Appl. No.: 13/658,827

(22) Filed: Oct. 24, 2012

(65) Prior Publication Data
US 2014/0114955 A1    Apr. 24, 2014

(51) Int. Cl.
G06F 7/00      (2006.01)
G06F 17/30     (2006.01)

(52) U.S. Cl.
CPC .................... *G06F 17/30389* (2013.01)

(58) Field of Classification Search
None
See application file for complete search history.

(56) References Cited

U.S. PATENT DOCUMENTS

| 8,073,869 | B2 | 12/2011 | Li et al. | |
|---|---|---|---|---|
| 2005/0289184 | A1* | 12/2005 | Dettinger | G06F 17/30967 |
| 2006/0075120 | A1 | 4/2006 | Smit | |
| 2009/0006543 | A1 | 1/2009 | Smit | |
| 2010/0179964 | A1* | 7/2010 | Ramaswamy | 707/780 |
| 2011/0264666 | A1* | 10/2011 | Gieseke | 707/741 |
| 2011/0264680 | A1 | 10/2011 | Lahr et al. | |
| 2012/0197896 | A1* | 8/2012 | Li et al. | 707/740 |
| 2013/0018840 | A1* | 1/2013 | Averbuch | 707/602 |

OTHER PUBLICATIONS

Li, et al., Efficient Type-Ahead Search on Relational Data: a TASTIER Approachz, Retrieved at <<http://www.ics.uci.edu/~chenli/pub/sigmod2009-tastier.pdf>>, Proceedings of SIGMOD, Jun. 29, 2009, pp. 12.
"Lookup Forms Overview [AX 2012]", Retrieved at <<http://msdn.microsoft.com/en-us/library/aa597861.aspx>>, Retrieved Date: Aug. 27, 2012, pp. 6.

(Continued)

*Primary Examiner* — Thu Nga Nguyen
(74) *Attorney, Agent, or Firm* — Thomas Marquis; Kate Drakos; Micky Minhas

(57) ABSTRACT

A search system, separate from a relational database, generates an index of information in the relational database that can be used to look up business records (or entities). A search system, that is also separate from the relational database, receives typing or other character inputs in a search user input mechanism and generates queries against the index based on the typing inputs, or other character inputs, received. The search system returns results and modifies those results as additional typing inputs, or characters, are received.

18 Claims, 16 Drawing Sheets

(56) References Cited

OTHER PUBLICATIONS

"Best Practices for Lookup Forms", Retrieved at <<http://msdn.microsoft.com/en-us/library/aa892864(v=ax.10).aspx>>, Retrieved Date: Aug. 27, 2012, pp. 2.
Li, et al., "Search-as-You-Type: Opportunities and Challenges", Retrieved at <<http://sites.computer.org/debull/A10mar/lichen-paper.pdf>>, Proceedings of Bulletin of the IEEE Computer Society Technical Committee on Data Engineering, Retrieved Date: Aug. 24, 2012, pp. 9.
Li, et al., "Efficient Fuzzy Type-Ahead Search in TASTIER", Retrieved at <<http://dbgroup.cs.tsinghua.edu.cn/wangjn/papers/icde2010-tastier-demo.pdf>>, Proceedings of ICDE Conference 2010, Retrieved Date: Aug. 24, 2012, pp. 4.
Baid, et al., "Toward Scalable Keyword Search over Relational Data", Retrieved at <<http://pages.cs.wisc.edu/~anhai/papers/scalable-kws-vldb10.pdf>>, Proceedings of the VLDB Endowment, Retrieved Date: Aug. 24, 2012, pp. 10.
"International Search Report & Written Opinion for PCT Patent Application No. PCT/US2013/065759", Mailed Date: Jan. 3, 2014 Filed Date: Oct. 18, 2013, 8 Pages.

\* cited by examiner

| COUNTRYREGIONID | ZIPCODE | STATE | COUNTY | CITY | STREET |
|---|---|---|---|---|---|
| DNK | DK-2950 | | | Vedbaek | Frydenlunds Alle 6 |
| IRL | DUBLIN | | | Dublin | Old Forrest Road 4546 |

SEARCH-AS-YOU-TYPE ON A RELATIONAL DATABASE

BACKGROUND

There are a wide variety of different types of search engines and search technologies used in current computer systems. Some such engines or technologies include web search engines, and search functions implemented in other applications, such as operating systems, web browsers, and data collaboration applications (such as note taking applications).

Some of these search engines and technologies implement a "search-as-you-type" function. In this function, as an end user is typing characters into a search field, the search engine performs repeated searches against a data store or an index. In one system, a search is executed each time the user pauses in their input for a given time (such as approximately 300 ms or a different time) to reduce or control the number of queries. In another system, one search (or query) is executed for each key stroke or character input by the user. In locating matching results, the search engine may perform prefix searching, in which the search engine estimates the entire query (based on the characters received thus far) and launches the estimated query. In another embodiment, the search engine searches for results that match the characters that have been input so far, and returns those matching results. As the user continues to type additional characters into the search field, the search engine refines the search based on the additional characters and returns results based on the refined search. It can be seen that the search-as-you-type function generates a large number of queries against the data store or data corpus that is to be searched.

There are a wide variety of different types of business data systems currently being used. Such systems include customer relations management (CRM) systems, enterprise resource planning (ERP) systems, line-of-business (LOB) applications, etc. Many of these business data systems are built on a relational database. Normally, in order to look up information in a relational database, a user generates a database query that is launched against an intra-database index. This type of database index must normally comply with all relational database properties (such as atomicity, consistency, isolation, and durability). Therefore, generating an intra-database index in a relational database can be time consuming and costly in terms of performance overhead.

In addition, many business data systems are accessed by a large number of users at a given time. Therefore, it can be difficult to service all of the various queries launched by the users against the relational database in a timely manner. Significantly increasing the number of queries launched against the relational database in a business data system would likely adversely affect performance.

The discussion above is merely provided for general background information and is not intended to be used as an aid in determining the scope of the claimed subject matter.

SUMMARY

A search system, separate from a relational database, generates an index of information in the relational database that can be used to look up business records (or entities). A search system, that is also separate from the relational database, receives typing or other character inputs in a search user input mechanism and generates queries against the index based on the typing inputs, or other character inputs, received. The search system returns results and modifies those results as additional typing inputs, or characters, are received.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A-3E show illustrative user interface displays.

DETAILED DESCRIPTION

Figure 1:
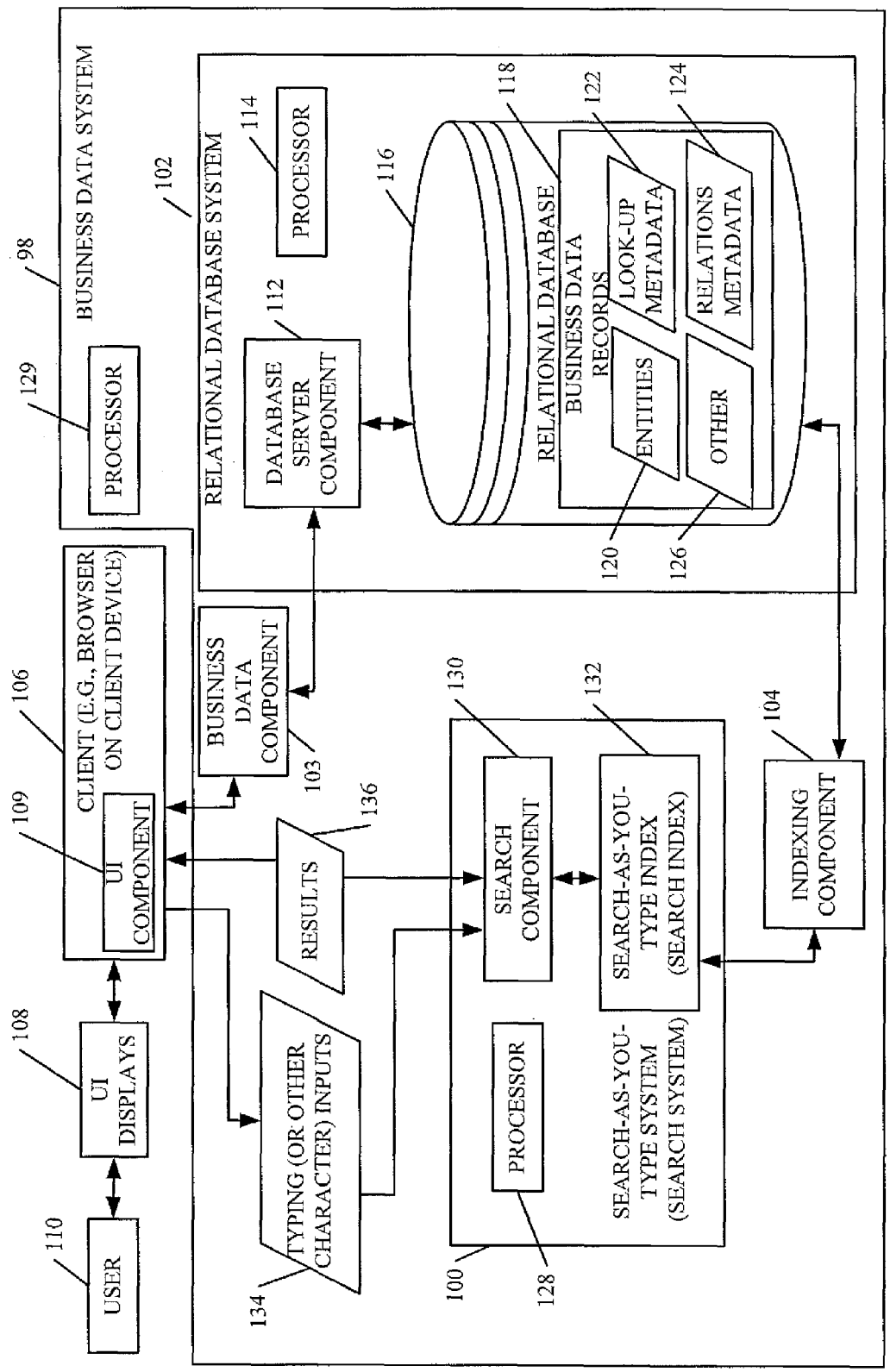
FIG. 1 is a block diagram of one illustrative embodiment of a business data system including a search system, along with a relational database system.

FIG. 1 is a block diagram of one illustrative embodiment of a business data system 98 with a search-as-you-type system (hereinafter search system) 100 in communication with relational database system 102. FIG. 1 also shows indexing component 104 and client 106 that has a user interface component 109 that generates user interface displays 108 for user 110. In one embodiment, client 106 is illustratively a browser or another application or component on a client device.

Business data system 98 can be any of a wide variety of different types of business data systems. For instance, it can be an enterprise resource planning (ERP) system, a customer relations management (CRM) system, a line-of-business (LOB) system or a wide variety of other business systems. In any case, the relational database system 102 is provided in business data system 98 for accessing business data records 118. Business data component 103 illustratively implements the particular system (such as the ERP system, the CRM system, the LOB system, etc.) and performs the functionality that allows user 110 to access and manipulate the relational database system.

Processor 129 is also illustratively a computer processor with associated memory and timing circuitry (not separately shown). It is illustratively a functional part of business data system 98 and is activated by, and facilitates the functionality of, the various components and systems within business data system 98.

FIG. 1 shows that relational database system 102 includes a database server 112, processor 114 and relational database 116 which, itself, includes the business data records 118. It will be noted that while the present system can be described with respect to any type of data stored in a relational database, it is described herein with respect to a business database system that includes business data records 118, for the sake of example. Business data records 118 can be a wide variety of different types of business data records, such as product records, customer records, contact records, financial records, sales records, personnel records, or a wide variety of other business records.

In the example, business data records 118 include entities 120, look up metadata 122 (that is, metadata that allows individual entities 120 to be looked up or retrieved through searching), relations metadata 124 that expresses the relations between the various entities 120, and a host of other metadata 126.

Processor 114 is illustratively a computer processor with associated memory and timing circuitry (not separately shown). Processor 114 is illustratively activated by, and facilitates the functionality of, database server component 112 and other items in relational database system 102. It will be appreciated, of course, that processor 114 can in fact include multiple processors or a single processor, and it can be integrated into database server component 112 or other items as well. It is shown separately as processor 114 for the sake of example only.

During normal operation of the business data system, a user 110 of relational database system 102 illustratively inputs queries against relational database 116 to look up business data records 118. The queries are input, illustratively through user input mechanisms on UI displays 108 and provided to database server component 112 which executes the queries against the relational database and returns results based on the queries.

System 98 also includes search system 100 which illustratively includes processor 128, search component 130 and search-as-you-type index (hereinafter search index) 132. In operation, search system 100 implements search-as-you-type functionality against relational database 116, without significantly increasing the indexing overhead or query overhead for relational database system 102. This is described in greater detail below with respect to FIG. 3. However, for the sake of example, a brief overview is now provided.

Indexing component 104 illustratively intermittently indexes the business data records 118 in relational database 116. Indexing component 104 does this to generate search index 132. As user 110 is inputting a search (such as typing characters in a search field generated on one of UI displays 108 or another suitable user input mechanism) client 106 provides the inputs 134 to search component 130 which executes queries against search index 132 based on each individual character received. In one embodiment, one query can be executed for every character input by the user. This is but one example and the system is described this way herein. In another embodiment, the number of queries can be reduced by waiting to perform them until the user pauses in providing the inputs for a predefined time period. For instance, if the user pauses in typing for 300 ms, for example, a query is executed. Of course, the predefined time period can be shorter or longer, and can be determined empirically or otherwise. In any case, component 130 returns search results 136 based upon the queries executed against index 132. As user 110 continues to type characters into the search field, search component 130 refines the search against index 132 based on those additional inputs and returns revised results 136 to client 106. Client 106 illustratively displays the results 136 in close proximity to the search field on the UI display 108 that user 110 is using to conduct the search.

Figure 2:
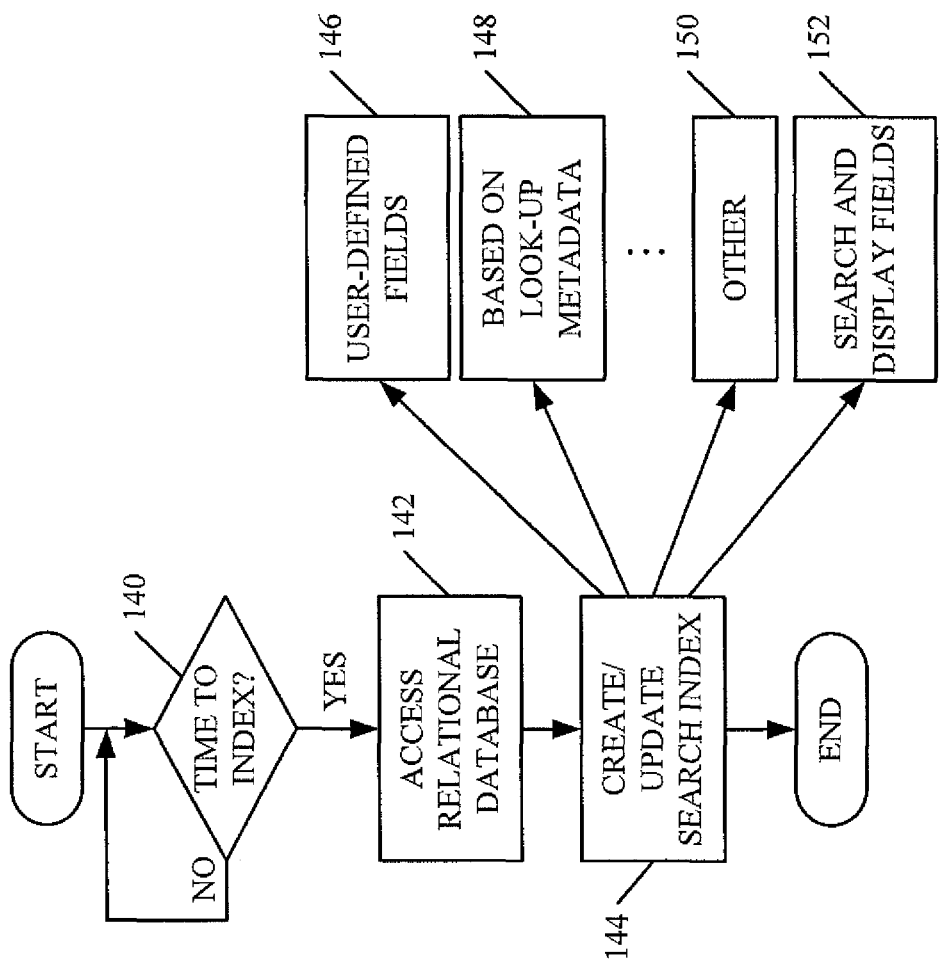
FIG. 2 is a flow diagram illustrating one embodiment of the operation of the system shown in FIG. 1 in generating an index.

Before describing the search-as-you-type functionality in greater detail, one embodiment of the operation of indexing component 104 will be described with respect to FIG. 2. FIG. 2 is a flow diagram illustrating one embodiment of the operation of indexing component 104 in generating search index 132 for search system 100.

Indexing component 104 first determines whether it is time to index (or update the index for) business data records 118 in relational database 116. This is indicated by block 140 in FIG. 2. Indexing component 104 can do this by intermittently or periodically indexing business data records 118. The period or intermittent time between indexing operations can illustratively be predefined or defined by an administrator or user, as desired. The time between indexing operations can illustratively vary based upon application and based upon the frequency with which the indexed data is modified in relational database 116. Frequently modified data can be indexed more often, while less frequently modified data can be indexed less often, or all data can be indexed at the same rate. In one embodiment, for instance, indexing component 104 updates index 132 every two days. This is an example only and other time periods can be used as well.

In any case, when indexing component 104 determines that it is time to index data, it accesses relational database 116. This is indicated by block 142 in FIG. 2. Indexing component 104 then either creates or updates search index 132 based upon the information in relational database 116. Creating and updating the search index is indicated by block 144 in FIG. 2. In doing so, indexing component 104 can index a variety of different kinds of information. In one embodiment, indexing component 104 indexes fields in business data records 118 that are selected by the user. Of course, the indexed fields can be predefined as well. Indexing the fields is indicated by block 146.

Indexing component 104 also illustratively indexes the business data based upon look-up metadata 122. That is, the individual entities 120 in relational database 116 illustratively include metadata that are used to locate the corresponding entity 120 in relational database 116. For every entity 120, there is illustratively a set of attributes that is marked as metadata 122 (e.g., as being needed to perform a look-up operation to locate the corresponding entity 120). In one embodiment, indexing component 104 copies this look-up metadata 122 out of relational database 116 and places it in search index 132. Indexing based on the look-up metadata is indicated by block 148 in FIG. 2. In addition, indexing component 104 can generate or update index 132 based on other information as well, and those fields can include name fields, description fields, note fields, customer account fields, menu items, labels for the menu items, etc. This other information is indicated by block 150 in FIG. 2.

In one embodiment, it will also be noted that the fields that are to be used by index component 104 in generating search index 132 may be of different types. For instance, in one embodiment, the fields that are indexed are only search fields. That is, they are used only to perform the searching in implementing the search-as-you-type functionality of search component 130. Other fields may be used to perform that type of search functionality, but may also be marked as display fields which are displayed when the results 136 are returned to user 110. Other fields may be displayed, but not used for searching, in one embodiment. Therefore, in one embodiment, the fields that are indexed can be marked as fields that are used only for searching, only for display, or for a combination of searching and display. This is indicated by block 152 in FIG. 2.

Figure 2A:
FIG. 2A shows one simplified embodiment of a portion of an index.

FIG. 2A shows one embodiment of an illustrative index 132 which is generated by indexing component 104. It can be seen that the index has a location ID field, a description field, an IS postal address field and a parent location field. Table 153 further assumes that indexing component 104 is indexing a store location ID field, but this field is not searchable (it is marked as being for display only). Assume that the index also stores the record ID (not shown in FIG. 2A). Further the "description" field is indexed for purposes of searching and display. In that case, the index will include the record ID, the location ID (which is marked for display only, and not for searching) and the description field (which is marked for both display and searching).

Figure 3:
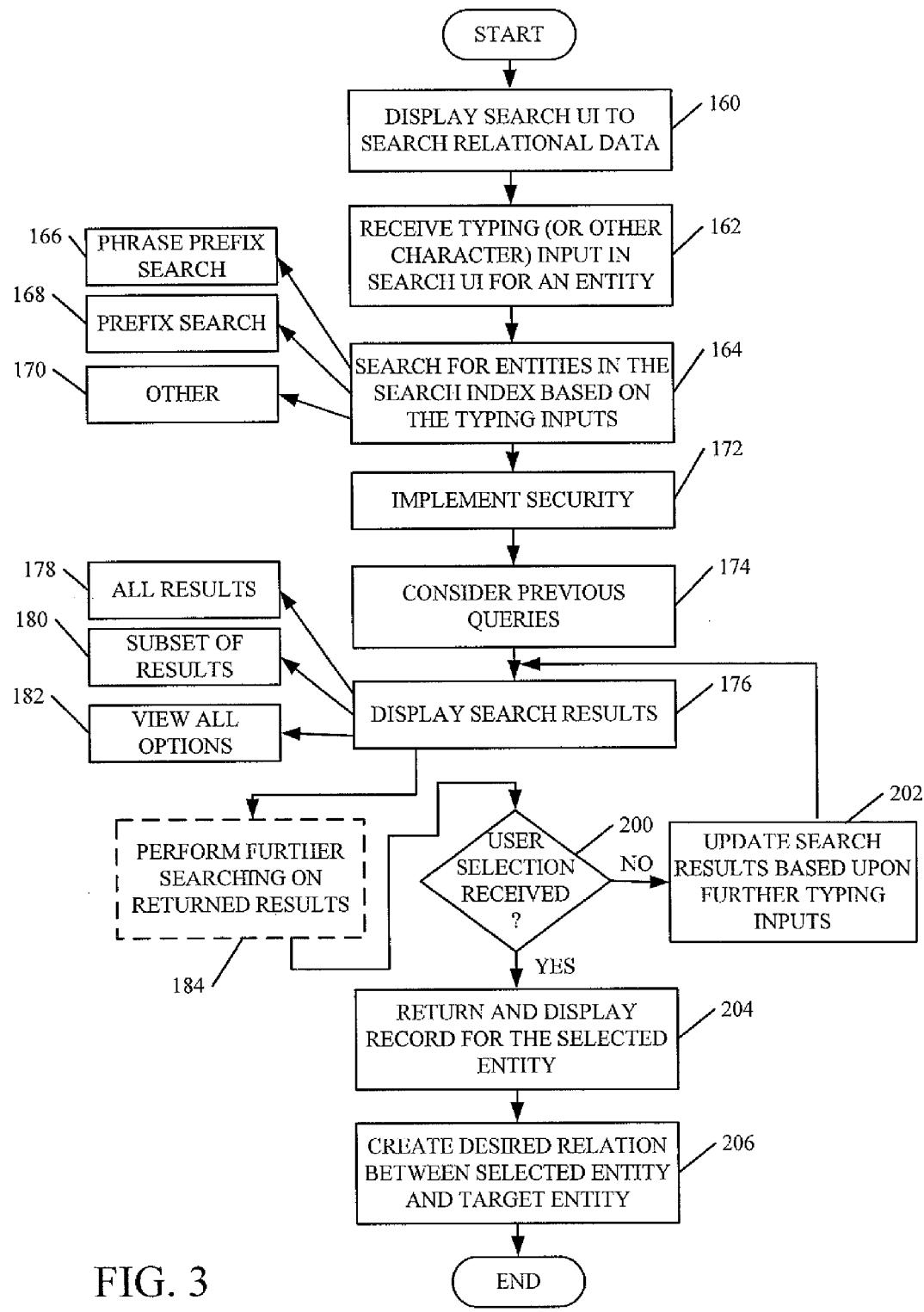
FIG. 3 is a flow diagram illustrating one embodiment of the operation of the system shown in FIG. 1 in performing a search-as-you-type function with the relational database.

Once search index 132 is created, it can be used by search component 130 to perform the search-as-you-type function. FIG. 3 is a flow diagram illustrating one embodiment of the operation of search system 100 in performing this. Search component 130 illustratively generates a user interface display which is provided by client 106 as one of UI displays 108 to user 110. The user interface display is a search user interface that allows user 110 to input characters (such as through typing or otherwise) to search for entities in relational database 116. Displaying the search UI to receive inputs to search relational data is indicated by block 160 in FIG. 3.

Search component 130 then receives the typing (or other character) inputs entered through the search UI. This is indicated by block 162 in FIG. 3.

Search component 130 then searches index 132 for entities represented in the search index 132 based on the typing inputs. This is indicated by block 164 in FIG. 3. Of course, search component 130 can perform a wide variety of different searches, using a wide variety of different search techniques. Some of those are shown in FIG. 3 by way of example only. For instance, component 130 can perform phrase prefix searching 166, simple prefix searching 168, or other types of searching 170.

Based on the query, component 130 returns results 136 to user 110, through client 106. In returning results, component 130 illustratively implements any role-based access or role-based security (or other security) that might be used by business data system 98. This is indicated by block 172 in FIG. 3. Similarly, search component 130 can consider previous queries submitted by user 110. For instance, if a user 110 has accessed a given entity previously, then the prefix search (or other search) being conducted can preferentially choose that entity over others. Considering previous queries in other ways is also contemplated. This is indicated by block 174 in FIG. 3.

In any case, once search component 130 launches the query against index 132, it obtains search results 136, and returns results 136 through client 106 and user interface displays 108 to user 110. This is indicated by block 176 in FIG. 3. It will be noted that, in one embodiment, the UI displays 108 can be generated by user interface component 109 in a variety of different ways. The results can be displayed on a user interface display that displays all results that match the query. This is indicated by block 178. Of course, the user interface display can display a subset of the results as indicated by block 180 and a "view all" option can be provided to user 110 so that the user can provide a suitable user input to view all of the results as well. The view all option is indicated by block 182 in FIG. 3.

Figure 3A:
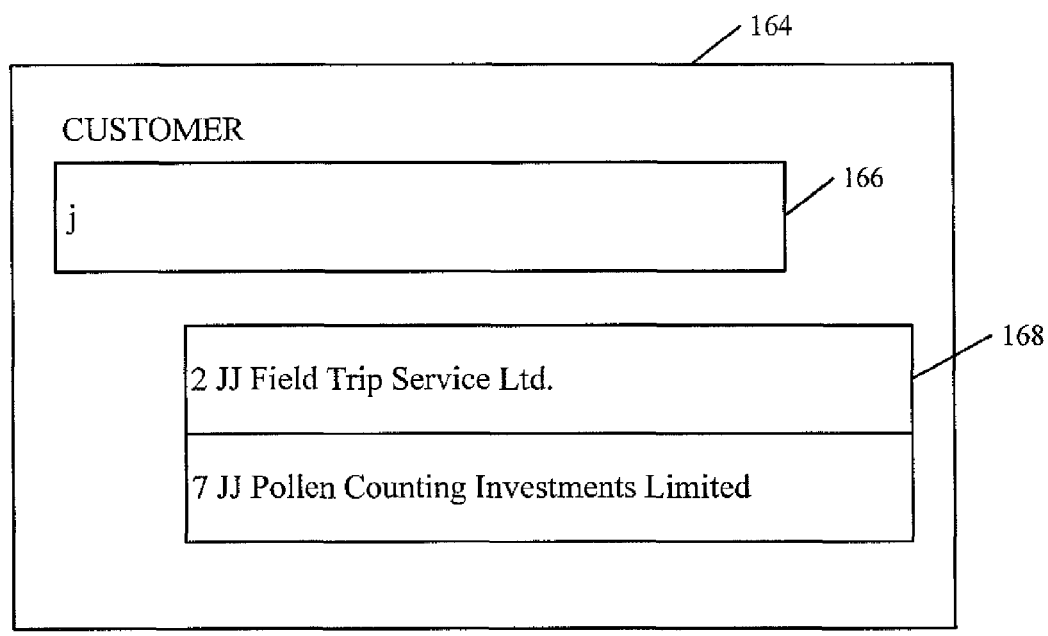

FIG. 3A shows one exemplary search user interface display 164 that can be used. User interface display 164 includes search field 166 and dropdown menu 168 that displays results 136. It can be seen in FIG. 3A that the user has typed the letter J in search field 166. In response, search component 130 searches index 132, and using the example index shown in FIG. 2A described above, finds two entries. The first entry is JJ Field Trip Service Ltd., and the second entry is JJ Pollen Counting Investments Limited.

FIG. 3A shows that when search component 130 is performing simple prefix searching, it searches the word in fields of the index that are to be searched (in this case the, "description" field). Since the user has typed "j" into search box 166, the two results in results menu 168 are returned because they have a "j" at the beginning of one of the words or text segments in the description field. In one embodiment, this can be done as shown, or by using syntax, such as "j*". This is exemplary only. In another embodiment, search component 130 locates any records that contain the letter "j" anywhere in the string.

Figure 3B:
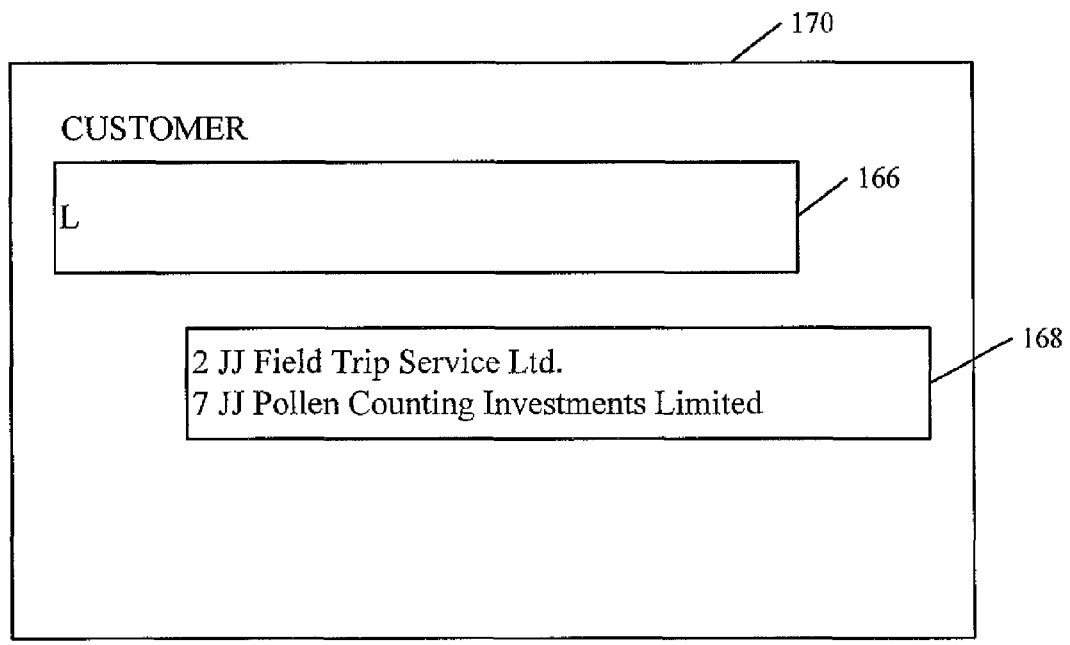

FIG. 3B is another embodiment of a search user interface display 170. Search user interface display 170 is similar to search user interface display 164 except that the user has typed the letter "1" into search box 166. Again, the results returned are the same as those shown in FIG. 3A, because search component 130 has found the letter "1" at the beginning of one of the words or text segments in the same two entries in the index.

Figure 3C:
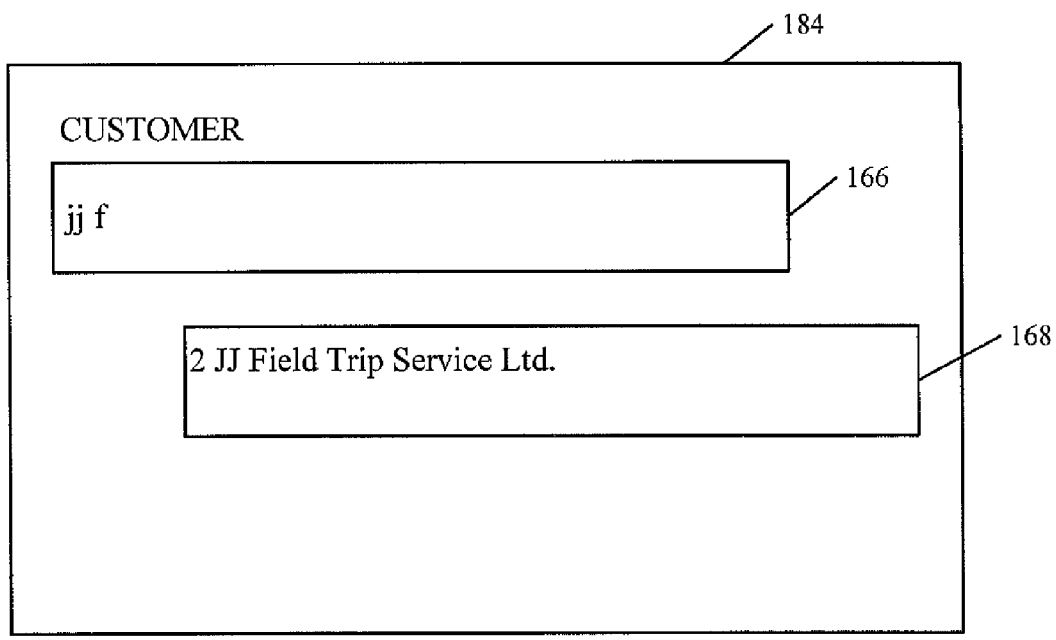

FIG. 3C shows another embodiment of a user interface display 184. User interface display 184 shows an example where search component 130 performs a prefix search on phrases. It can be seen that the user has entered the character string "jj f" in search box 166. Because search component 130 performs a prefix search on phrases in the index records, it returns only the record for "JJ Field Trip Service Ltd." in dropdown display 168. This type of searching assists user 110 in narrowing down results, from the simple prefix search described above with respect to FIGS. 3A and 3B.

It will also be noted that, if multiple fields in search index 132 are searchable by search component 130, then text input by the user is searched across all searchable fields in index 132. In one embodiment, this is done automatically, without requiring user 110 to input the particular fields that are to be searched. They are marked as searchable fields in the index and they are automatically searched by search component 130 in generating results based on the user inputs.

FIG. 3D shows another embodiment of an exemplary set of index entries 133. It can be seen that the index component 104 has indexed six fields including a country or region ID, a zip code, a state, a county, a city and a street. As the user types (or otherwise inputs) characters 134, search component 130 searches all of the fields in the index entries 133 shown in FIG. 3D and returns results. Table 1 below lists a set of inputs, all of which will match the first row shown in FIG. 3D. Table 1 also shows which columns will be matched.

TABLE 1

1. fry (match on STREET column)
2. ved (match on CITY column)
3. ad (match on STREET column)
4. all (match on STREET column)

Table 2 below shows a list of inputs, all of which will match the second row shown in FIG. 3D. Table 2 also shows the particular column that will be matched.

TABLE 2

1. Du (match on ZIPCODE and CITY columns)
2. FO (match on STREET column)

Of course, these are exemplary only and they provide examples of character inputs that will match the rows, because multiple different fields are searched by search component 130 in performing the search-as-you-type function.

Figure 3E:
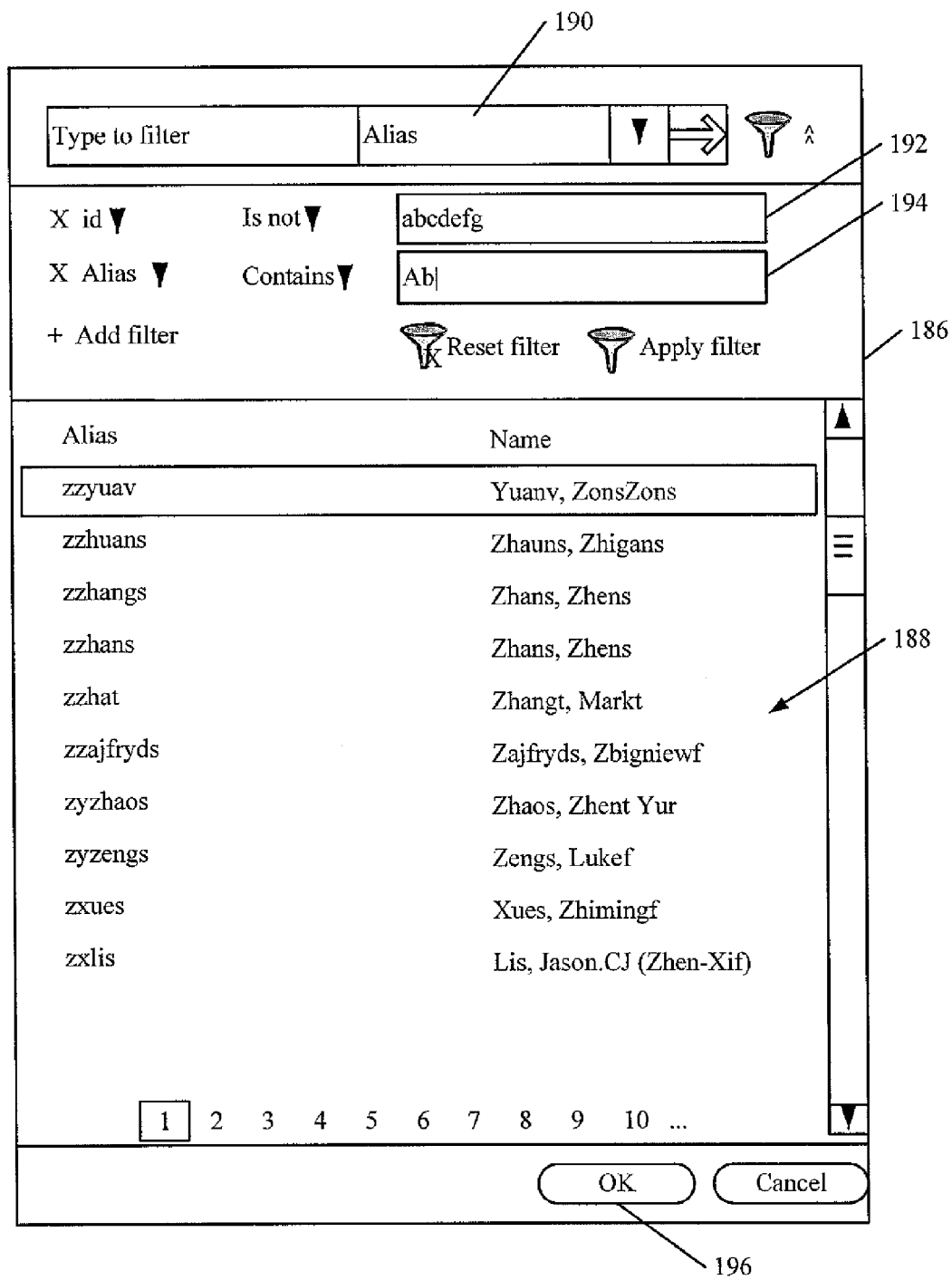

In one embodiment, user 110 can also perform further structured searches against the returned search results 136. This is illustrated by block 184 in FIG. 3. It will be noted that block 184 is shown in phantom, because it is optional. FIG. 3E shows one illustrative user interface display 186 that allows the user to do this. In the embodiment illustrated, results 136 are returned and displayed in results pane 188. The user can illustratively select one of the displayed results simply by clicking on it, or otherwise actuating it. Alternatively, the user can perform additional searching. For instance, in the embodiment shown in FIG. 3E, the user has indicated that the results are to be further filtered based on the "alias" field, because this is entered into filter field 190. The user has also indicated that the results are to be filtered so that the alias field does not contain the letter string "amitkul" as shown in field 192, but that it does contain the letter string "ab" as indicated in block 194. After having entered these further search parameters, the user can simply actuate the "ok" button 196 and the results displayed in results pane 188 are further filtered or sorted by search component 130, based upon the further inputs provided by user 110 in fields 190, 192 and 194.

Once search results 136 have been displayed on UI displays 108 to user 110, the user can illustratively select one of the search results from the displayed set of results, or the user can provide additional typing (or other character) inputs so that search component 130 can continue to perform the search-as-you-type function and further narrow the returned results 136 displayed to user 110. Determining whether the user has selected one of the results is indicated by block 200 in FIG. 3. Updating the search results based on further typing inputs is indicated by block 202, and processing then reverts to block 176 where the updated search results are displayed to the user.

However, if, at block 200 it is determined that the user has selected one of the search results, then search component 130 returns and displays the record corresponding to the selected search result. This is indicated by block 204. In one embodiment, when the user selects one of the search results, the selected result corresponds to one of entities 120 from business data records 118. Therefore, search component 130 returns the selected entity and displays it to the user.

Business data component 103 also illustratively generates the proper relation between the selected entity and a target entity in relational database 116. By way of example, assume that the user has created a project and needs to assign the project to a target entity. The user uses search system 100 to identify the target entity (such as an entity corresponding to a given customer). When the user selects the search result corresponding to the given customer from the returned results 136, business data component 103 illustratively assigns the appropriate relation between the project just created and the given customer entity in relational database 116. This may include, by way of example, defining an association between the entity corresponding to the given customer and the entity representing the project. Of course, other relations can be created as well between items input by user 110 and a target record in relational database 116. Creating a desired relation between a selected entity and the target entity is indicated by block 206 in FIG. 3.

It can thus be seen that system 100 can be used in a wide variety of different contexts. One exemplary context is when user 110 is searching for a known value. Assume, for instance, that user 110 has a large quantity of paper orders to enter into business data system 98. Each paper order contains the name of the customer for which the order is to be entered. User 110 opens a sales order form in business data system 98. One piece of information to enter is the name of the customer that relates to the sales order. User 110 can simply type the first few characters (or even a single character) of the name of the customer from the paper sales order into a customer field on the sales order form and be presented with a dropdown menu (or other user interface display 108) of returned results 136, based upon the first few (or single) characters entered into system 100. Search component 130 identifies the relevant fields that are to be displayed to user 110 as results 136, and results 136 can be displayed so that the first result in the list is selected by default. Of course, if user 110 changes the focus in the list, then other results can be selected as well. As the user continues to type the characters without selecting one of the results, search component 130 launches additional searches against index 132 and updates the displayed results 136.

In another example, user 110 can use system 100 to search for partially known values. Assume, for instance, that user 110 was interrupted in the task of entering sales orders into business data system 98, but decides to resume that task. Assume further that user 110 was on the phone, earlier in the day, with a sales associate who gave user 110 details of a sales order to enter into system 98. It may happen that user 110 has written down the details of the sales order on a piece of paper, but is unable to completely recall whether the name of the customer (that may be scribbled in a messy way on a piece of paper) was "Sunflaw Wholesales" or Sunglyph Wholesales" in system 98. User 110 thus opens the sales order form in system 98 and navigates to a customer field and begins typing. After every character typed (or after a pause in typing by the user), user 110 is presented with results of customers that match the characters entered, thus far, in the query. Search component 130 can perform the search across multiple different fields such as customer name, description, notes, customer account, etc. As user 110 begins typing "su" there may be many customers that match the query. A subset of these can be presented to user 110 as part of user interface displays 108, and user 110 can be provided an option to see all of the results, by actuating a suitable user input mechanisms. Now, user 110 decides to narrow results by typing an additional letter, and enters the letter "n" so that the entered string is "sun". This may narrow down the results sufficiently that user 110 can now decipher the hand written notes taken earlier in the day.

System 100 can also be used to look up unknown values. Assume that, in another example, user 110 is again entering sales orders into system 98 and notices that one particular order has contact information mentioned. User 110 can navigate to the "contact" box within that entity and request a list of contacts. User 110 then notices that the contact list contains hundreds of contacts that have previously been entered by various sales associates into system 98. However, user 110 can enter a region and country into one or more search fields. As user 110 begins entering characters for the region and country, search system 130 beings to narrow the list of contacts to those corresponding to the region and country character strings entered in the appropriate user input fields.

Figure 4:
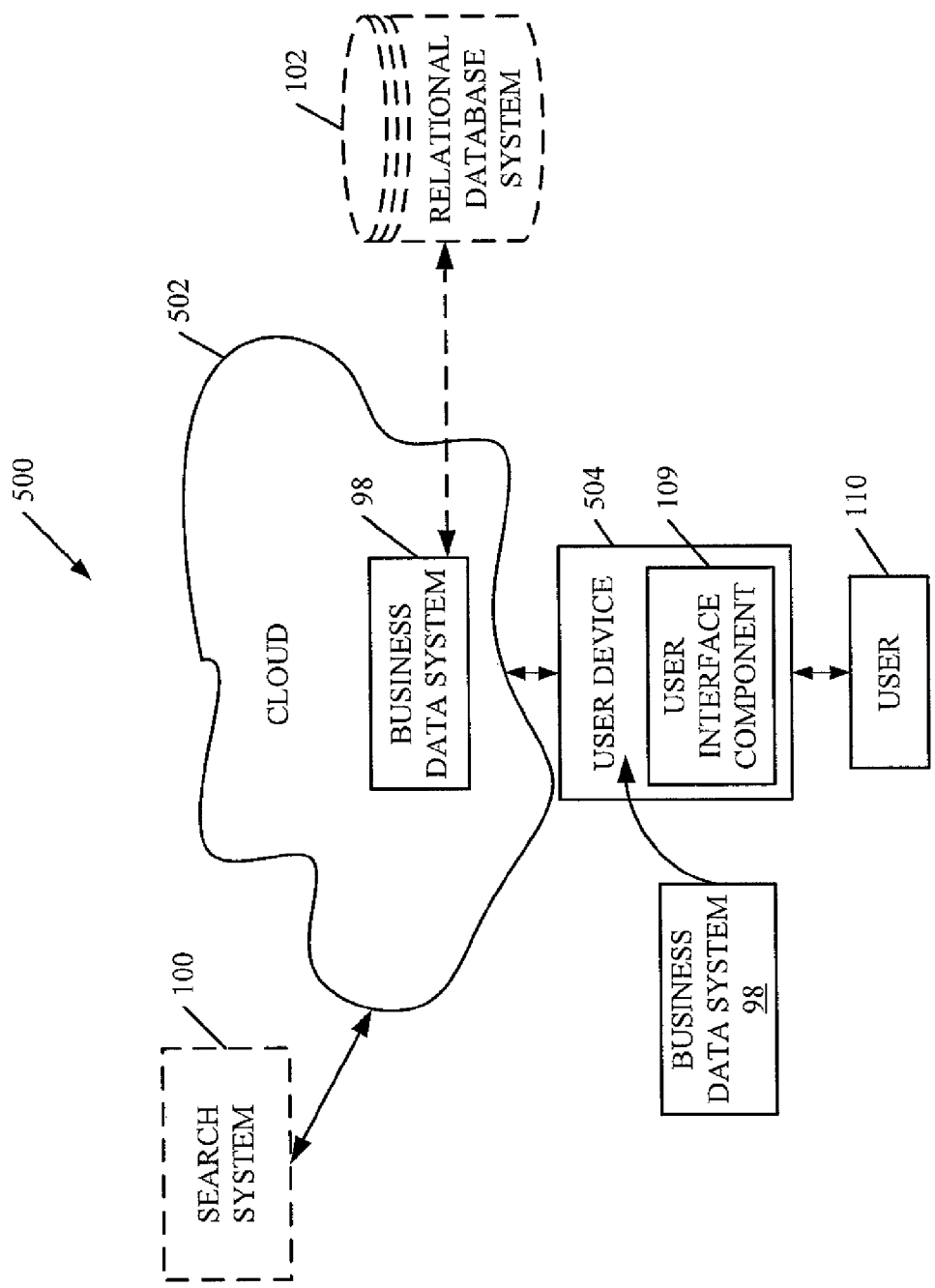
FIG. 4 shows one embodiment of the system shown in FIG. 1 in various architectures, including a cloud computing architecture.

FIG. 4 is a block diagram of system 98, shown in various architectures, including cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 98 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

The embodiment shown in FIG. 4, specifically shows that business system 98 is located in cloud 502 (which can be public, private, or a combination where portions are public while others are private). Therefore, user 110 uses a user device 504 (which can be a client device with client 106) to access those systems through cloud 502.

FIG. 4 also depicts another embodiment of a cloud architecture. FIG. 4 shows that it is also contemplated that some elements of business system 98 are disposed in cloud 502 while others are not. By way of example, database system 102 can be disposed outside of cloud 502, and accessed through cloud 502. In another embodiment, some or all of the components of system 98 are also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. FIG. 4 further shows that some or all of the portions of system 98 can be located on device 504. All of these architectures are contemplated herein.

It will also be noted that system 98, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
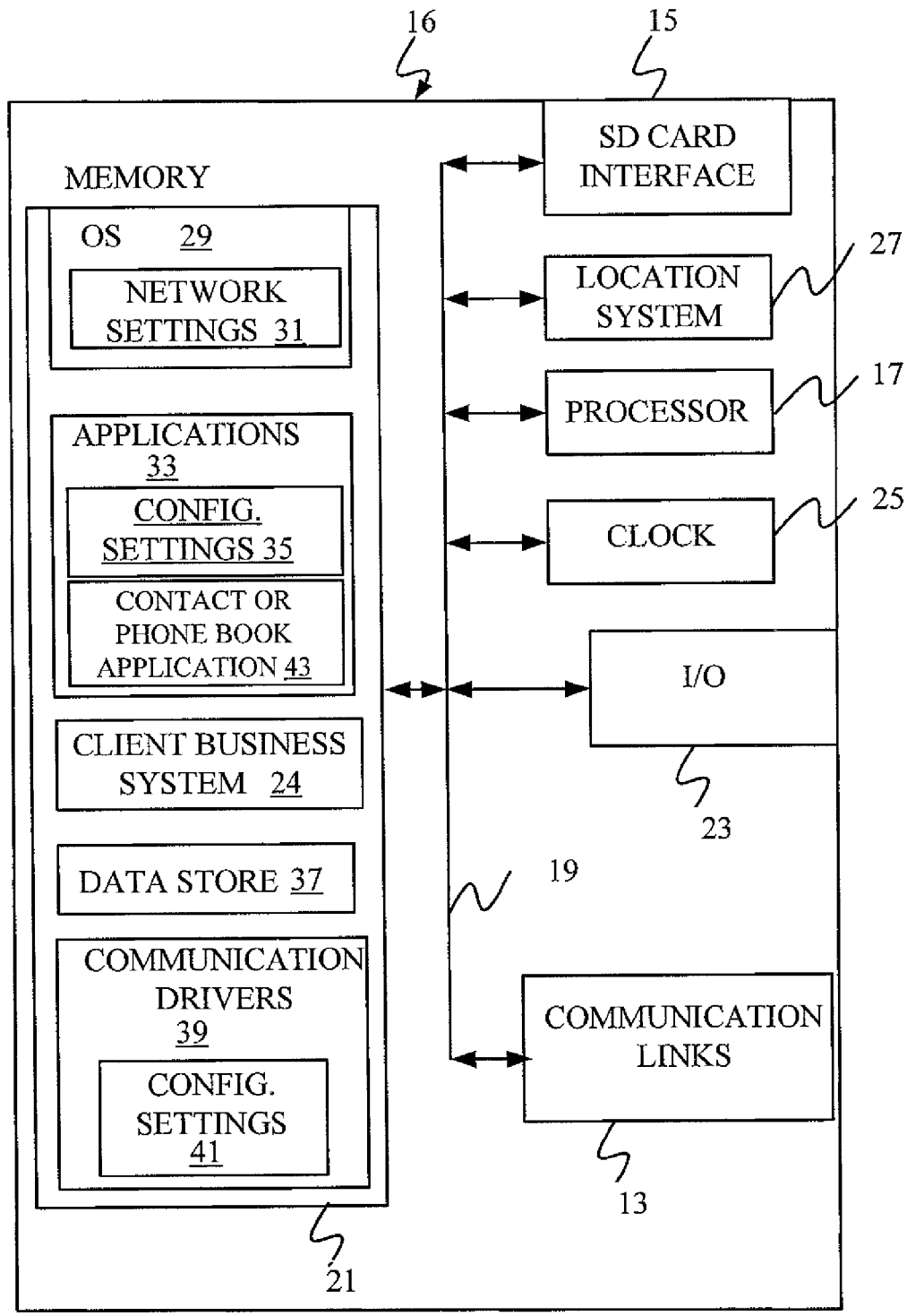
FIGS. 5-9 show various embodiments of mobile devices.

FIG. 5 is a simplified block diagram of one illustrative embodiment of a handheld or mobile computing device that can be used as a user's or client's hand held device 16, in which the present system (or parts of it) can be deployed. FIGS. 6-9 are examples of handheld or mobile devices.

FIG. 5 provides a general block diagram of the components of a client device 16 that can run components of system 98 or that interacts with system 98, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 98) are received on a removable Secure Digital (SD) card that is connected to a SD card interface 15. SD card interface 15 and communication links 13 communicate with a processor 17 (which can also embody processors 114, 128 or 129 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 98 or the items in database system 102, for example, can reside in memory 21. Similarly, device 16 can have a client business system 24 which can run various business applications or embody parts or all of system 98. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 6:
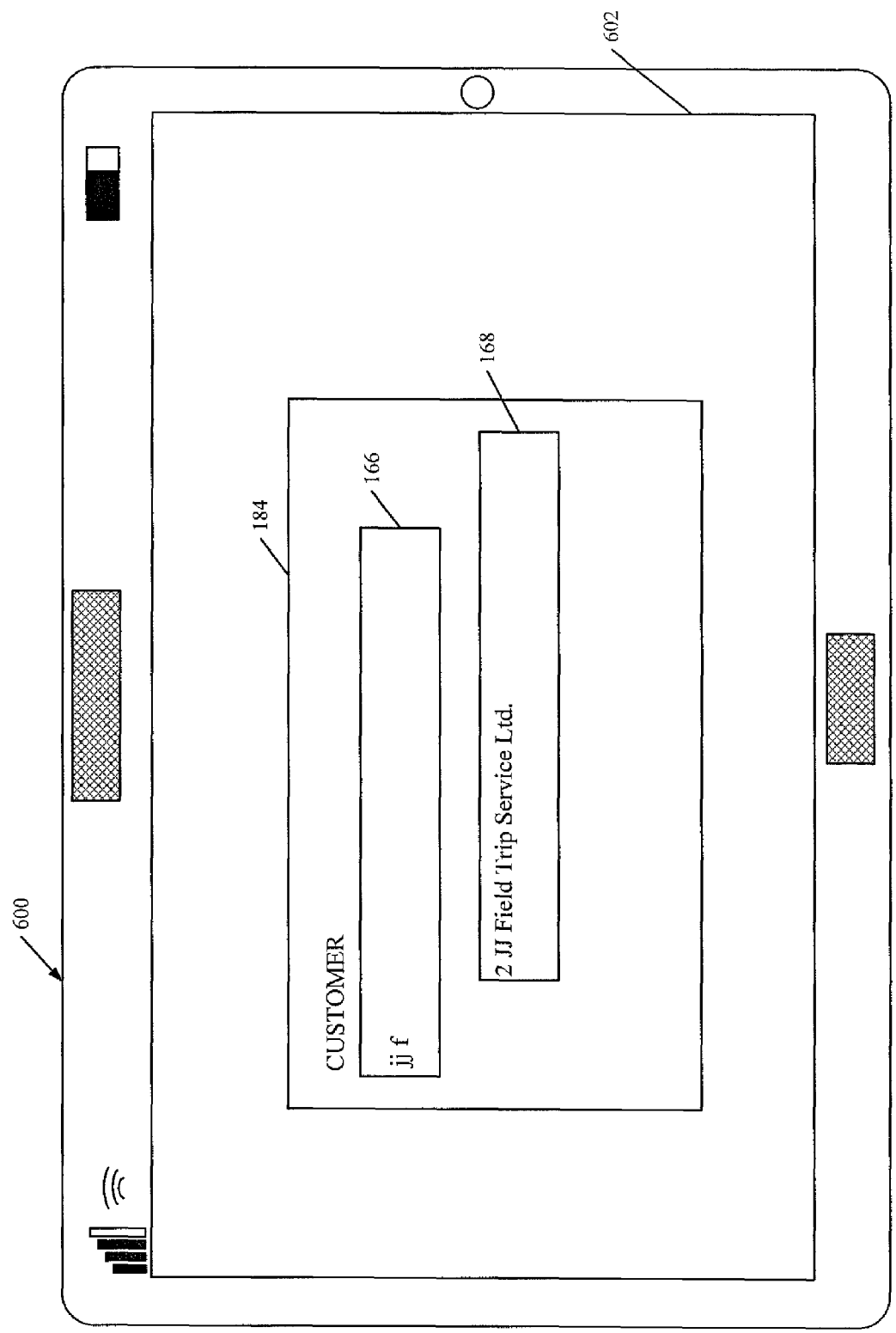
Figure 7:
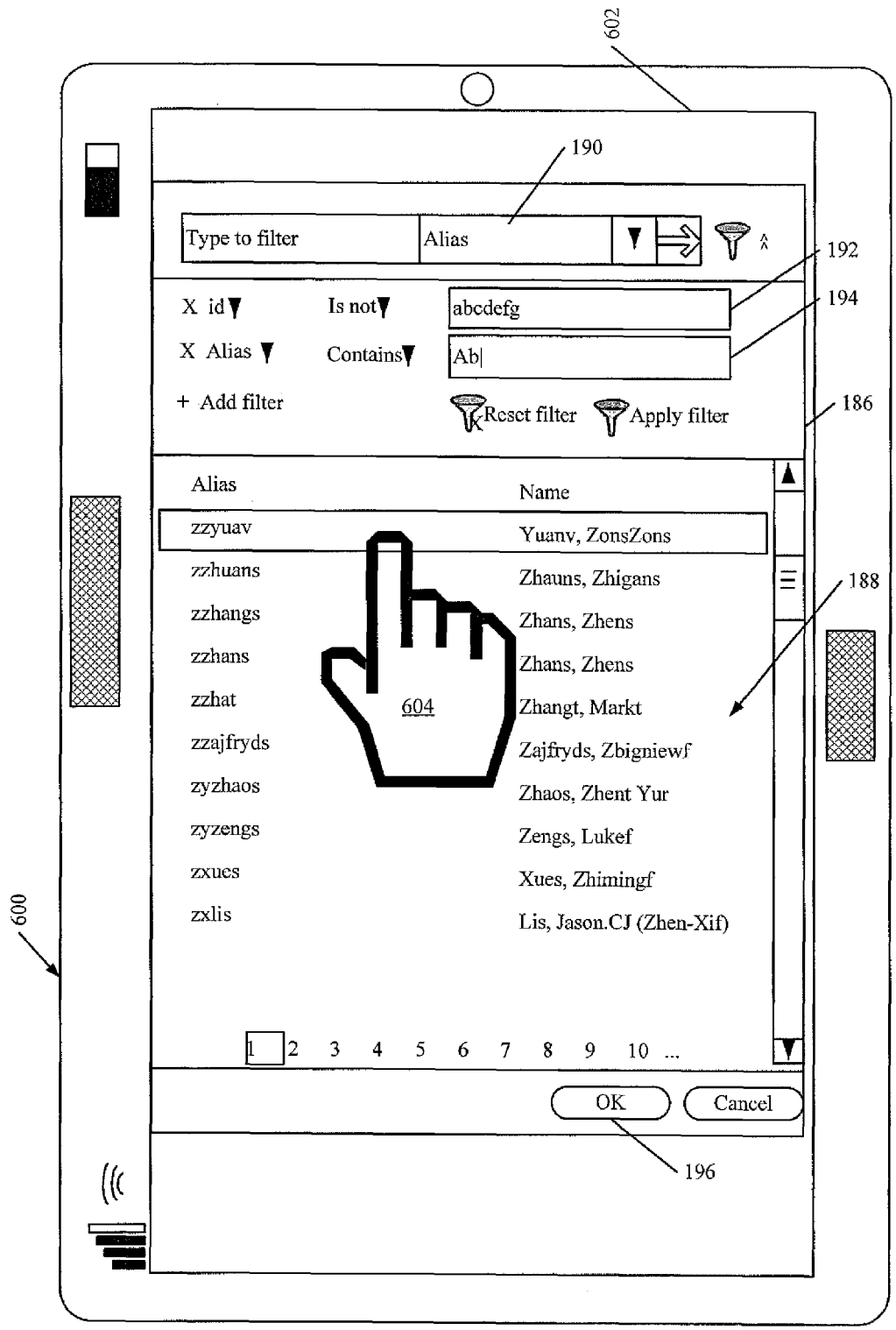

FIGS. 6 and 7 show one embodiment in which device 16 is a tablet computer 600. In FIG. 6, computer 600 is shown with user interface display 184 from FIG. 3C displayed on display screen 602. FIG. 7 shows computer 600 with user interface display 186 from FIG. 3D displayed on screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
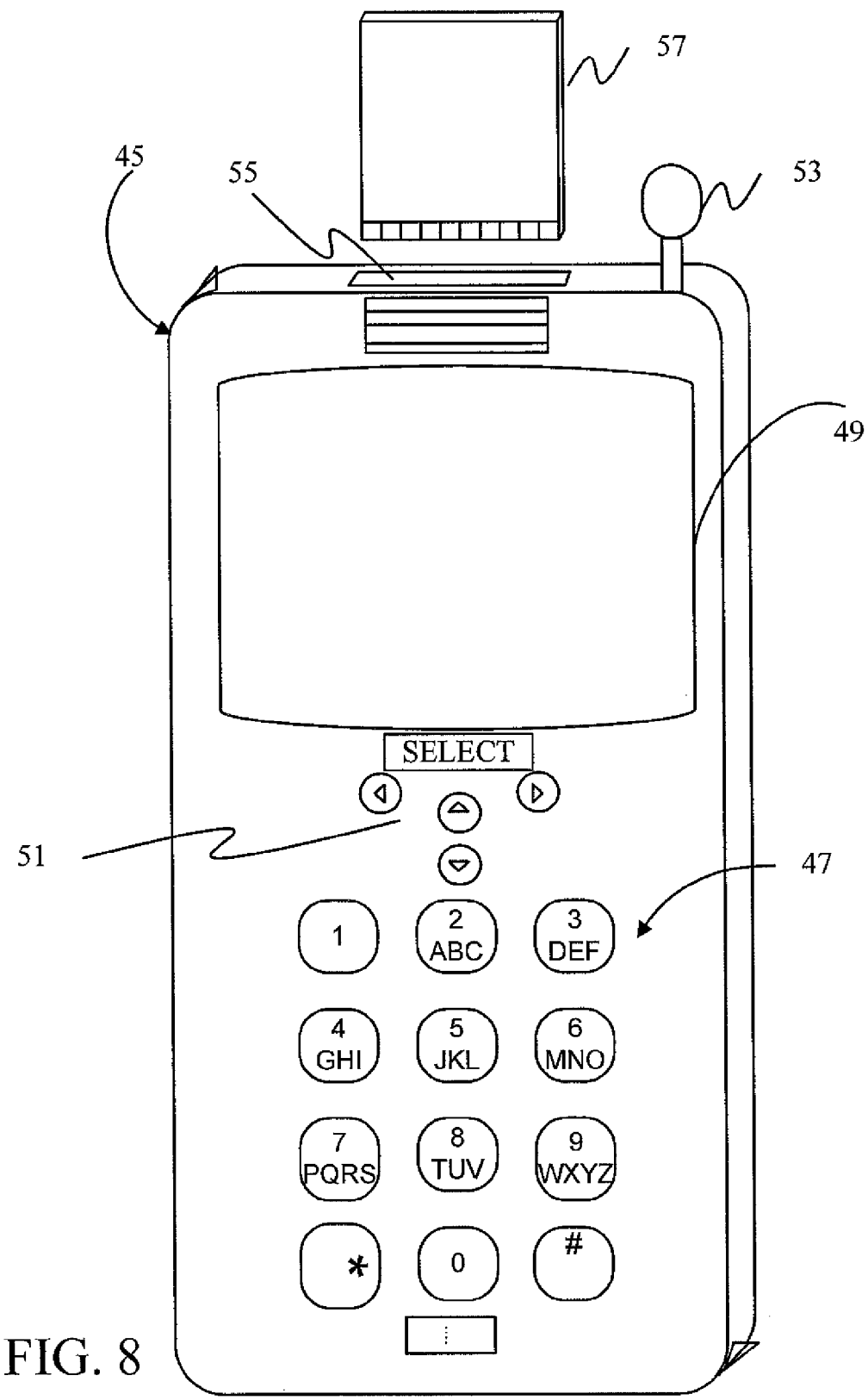
Figure 9:
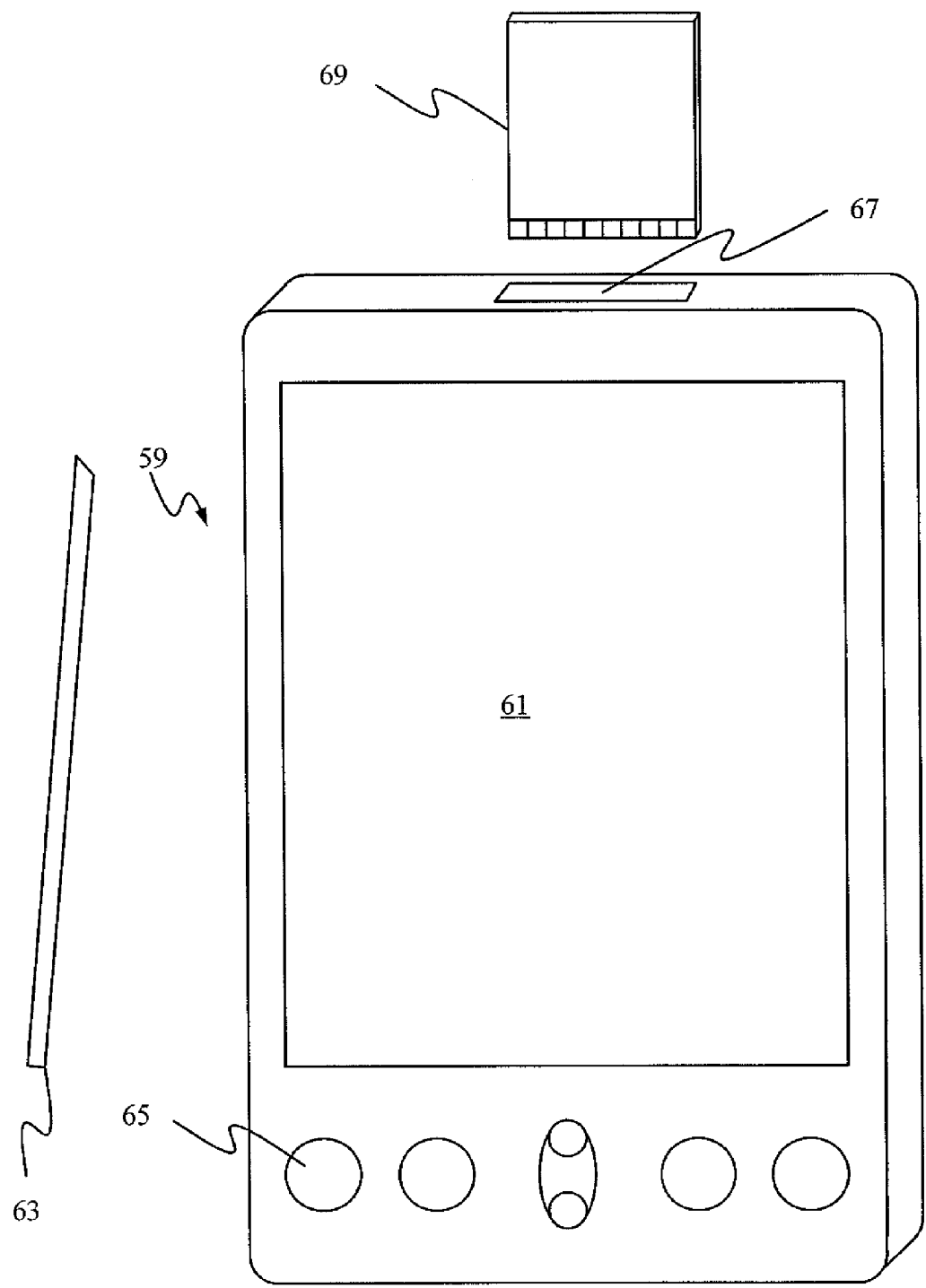

FIGS. 8 and 9 provide additional examples of devices 16 that can be used, although others can be used as well. In FIG. 8, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 10:
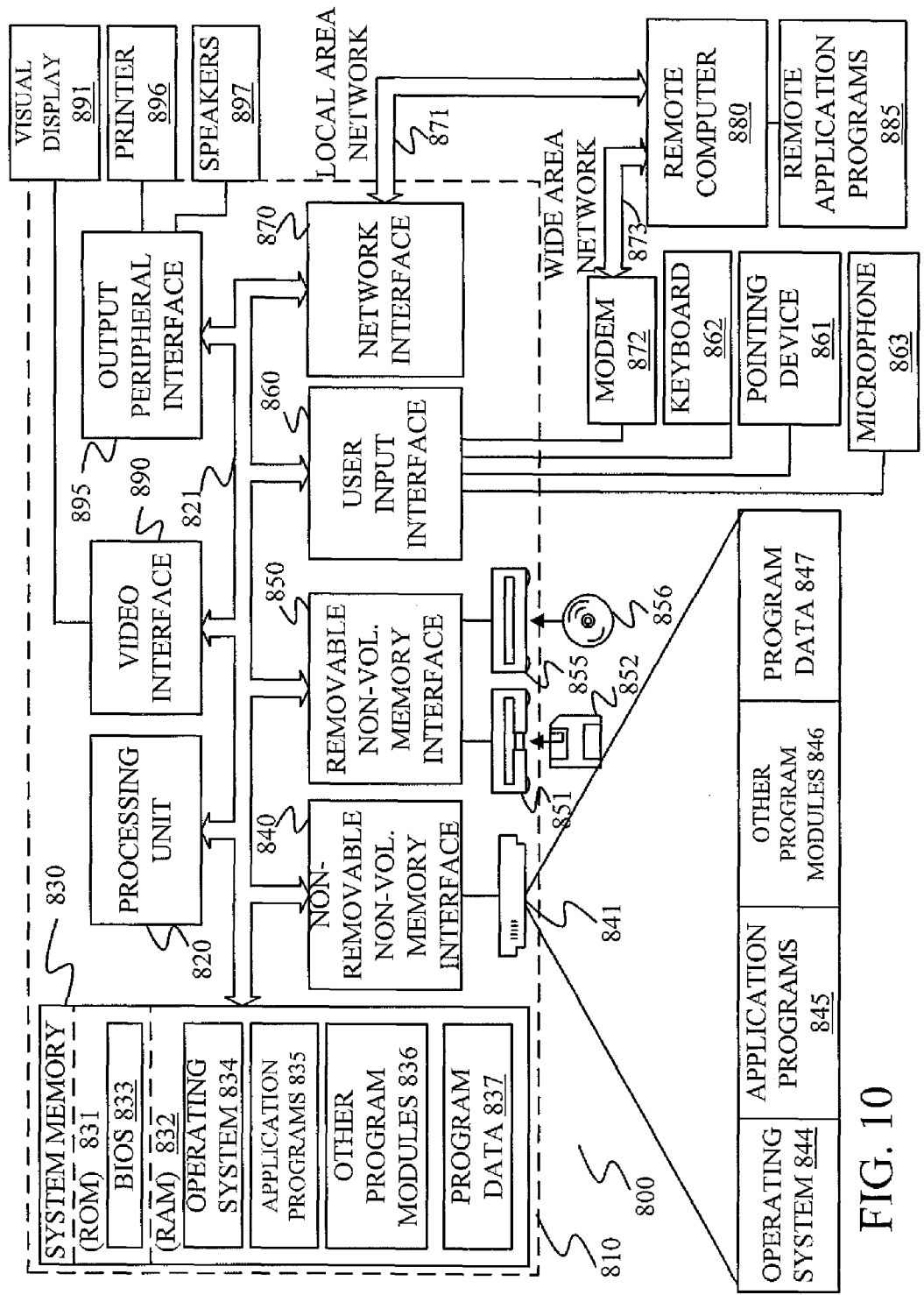
FIG. 10 shows one embodiment of a block diagram of a computing environment.

FIG. 10 is one embodiment of a computing environment in which system 98 (for example) can be deployed. With reference to FIG. 10, an exemplary system for implementing some embodiments includes a general-purpose computing device in the form of a computer 810. Components of computer 810 may include, but are not limited to, a processing unit 820 (which can comprise processors 114, 128 and 129), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to previous figures can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of accessing data, comprising:
   identifying an entity in a relational database;
   identifying look-up metadata used to locate the entity in the relational database;
   using an indexing component to generate an index based on one or more fields of the entity in the relational database, wherein the index is separate from the relational database and stores the look-up metadata;
   receiving an indication of a first character input, of a multi character query, in a search user input mechanism;
   prior to acting on a subsequent character input of the multi character query, searching the index based on the first character input to obtain a search result corresponding to the entity;
   receiving an indication of user selection of the search result; and
   based on the indication of user selection of the search result, accessing the entity in the relational database using the look-up metadata stored in the index, wherein accessing the entity in the relational database using the look-up metadata stored in the index comprises:
   locating a data record in the relational database using the look-up metadata, the data record corresponding to the entity;
   identifying a data field in the data record; and
   generating a representation of a results user interface display that displays the data field.

2. The computer-implemented method of claim 1 wherein the first character input comprises a plurality of characters and wherein searching is performed based on a determination that the user pauses in providing the multi character query for a given time period.

3. The computer-implemented method of claim 1 wherein the multi character query comprises a textual input, and the method further comprises:
   generating a representation of a search user interface display with a search user input mechanism that receives indications of individual characters in the textual input.

4. The computer-implemented method of claim 3, wherein the search user interface display includes the search result as a list in a drop down display adjacent the search user input mechanism.

5. The computer-implemented method of claim 1 and further comprising: receiving an indication of a set of subsequent character inputs in the multi character query; and
   after each character input in the subsequent character inputs, and prior to receiving a next character input in the subsequent character inputs, searching the index of entities in the relational database based on the received character inputs.

6. The computer-implemented method of claim 1 wherein searching the index comprises: searching using a search component that is separate from the relational database.

7. The computer-implemented method of claim 1 and further comprising:
   automatically generating an association in the relational database between a target entity and the identified entity.

8. The computer-implemented method of claim 1, and further comprising:
   generating a representation of a search result user interface display that displays the search result on a results pane; and generating a representation of an additional search user input mechanism.

9. The computer-implemented method of claim 8, wherein the search result comprises a set of search results, and further comprising:
receiving an indication of an additional search user input from the additional search user input mechanism; and
based on the indication of the additional search input, identifying a filter criterion;
filtering the set of search result based on the filter criterion to obtain a filtered set of search results; and
generating the representation of the search result user interface display that displays the filtered set of search results in the results pane.

10. The computer-implemented method of claim 1 wherein searching the index comprises:
searching the index using at least one of:
a prefix search; or
a phrase prefix search.

11. An electronic data processing system, comprising:
a processor;
a memory device coupled to the processor, the memory device having instructions stored thereon which, when executed by the processor, cause the processor to provide at least one of a relational database system, a data component, an indexing system, and a search system;
the relational database system including a relational database and a database server component, the relational database including an entity;
the data component being configured to receive data user input and implementing a data operation in the relational database system based on the data user input;
the indexing component being configured to access the relational database and generate a search index based on one or more fields of the entity in the relational database based on a user selection, wherein the search index is separate from the relational database and stores look-up metadata used to locate the entity in the relational database; and
the search system being configured to:
generate a representation of a search user interface display that includes a search user input mechanism;
receive an indication of a first character input, of a multi character query, in the search user input mechanism;
prior to acting on a subsequent character input of the multi character query, search the search index based on the first character input to obtain a search result corresponding to the entity;
receive an indication of user selection of the search result;
based on the indication of user selection of the search result, locate a data record in the relational database using the look-up metadata, the data record corresponding to the entity;
identify a data field in the data record; and
generate a representation of a results user interface display that displays the data field.

12. The data system of claim 11, wherein the user selection selects a subset of fields from a plurality of fields for the entity in the relational database.

13. The data system of claim 12, wherein the user selection defines, for each field of the subset of fields, whether the field is at least one of:
a search field searchable by the search system; or
a display field that is displayed upon the search system returning the entry as a search result.

14. An electronic data processing system, comprising:
a processor;
a memory device coupled to the processor, the memory device having instructions stored thereon which, when executed by the processor, configure the electronic data processing system to:
identify an entity in a relational database that stores corresponding data for the entity;
identify an indexing parameter that includes look-up metadata indicative of a location of the entity in the relational database; and
use an indexing component to generate a search index based on a field of the entity based on the indexing parameter, wherein the search index is separate from the relational database and stores the look-up metadata;
receive an indication of a first character input, of a multi character query, in a search user input mechanism;
prior to acting on a subsequent character input of the multi character query, search the search index based on the first character input to obtain a search result corresponding to the entity;
receive an indication of user selection of the search result;
based on the indication of user selection of the search result, locate a data record in the relational database using the look-up metadata, the data record corresponding to the entity;
identify a data field in the data record; and
generate a representation of a results user interface display that displays the data field.

15. The electronic data processing system of claim 14, wherein the indexing parameter indicates which fields of a set of fields associated with the entity in the relational database are to be indexed by the indexing component.

16. The electronic data processing system of claim 15, wherein the indexing component generates the search index to include a search index entry corresponding to the entity in the relational database, the search index entry having a plurality of fields that each store a different portion of data from the set of fields indicated by the indexing parameter.

17. The electronic data processing system of claim 16, wherein each field of the plurality of fields in the search index entry is marked to indicate whether the field is a search field searchable by the search system and whether the field is a display field that is displayed upon the search index entry being returned as a search result.

18. The electronic data processing system of claim 17, wherein the relational database stores data corresponding to a plurality of entities, and the search index comprises a plurality of entries, each entry corresponding to one of the entities in the relational database and having a plurality of fields that each store a different portion of data for the corresponding entity.

* * * * *